(12) United States Patent
Maeda et al.

(10) Patent No.: US 7,052,629 B2
(45) Date of Patent: May 30, 2006

(54) BINDER FOR BATTERY, SLURRY FOR BATTERY ELECTRODE, ELECTRODE FOR LITHIUM SECONDARY BATTERY, AND LITHIUM SECONDARY BATTERY

(75) Inventors: Koichiro Maeda, Kawasaki (JP); Haruhisa Yamamoto, Tokyo (JP)

(73) Assignee: Zeon Corporation, Tokyo (JP)

( * ) Notice: Subject to any disclaimer, the term of this patent is extended or adjusted under 35 U.S.C. 154(b) by 488 days.

(21) Appl. No.: 10/338,645

(22) Filed: Jan. 9, 2003

(65) Prior Publication Data

US 2003/0113626 A1   Jun. 19, 2003

Related U.S. Application Data

(63) Continuation of application No. 09/380,500, filed as application No. PCT/JP98/00893 on Mar. 4, 1998, now abandoned.

(30) Foreign Application Priority Data

Mar. 4, 1997   (JP) .................... 9-65493

(51) Int. Cl.
H01M 4/62 (2006.01)
C09D 109/00 (2006.01)
C09D 125/10 (2006.01)
C09D 133/12 (2006.01)

(52) U.S. Cl. ............... 252/511; 252/500; 252/182.1; 429/217; 429/21; 524/460; 524/543; 523/201

(58) Field of Classification Search ........... 252/511, 252/182.1; 429/217, 21; 524/543, 460; 523/201
See application file for complete search history.

(56) References Cited

U.S. PATENT DOCUMENTS

| 5,120,889 | A | * | 6/1992 | Yamamoto et al. ......... 524/460 |
| 5,707,763 | A | * | 1/1998 | Shimizu et al. ............. 429/217 |
| 5,776,651 | A | | 7/1998 | Lu et al. ................. 523/201 X |
| 5,895,801 | A | | 4/1999 | Lee ........................ 523/201 X |
| 6,156,453 | A | | 12/2000 | Shimizu et al. |
| 6,652,773 | B1 | * | 11/2003 | Maeda et al. ............... 427/189 |
| 6,773,838 | B1 | * | 8/2004 | Suzuki et al. ................ 429/21 |

FOREIGN PATENT DOCUMENTS

| JP | 6-203836 | | 7/1994 |
| JP | 6-275279 | | 9/1994 |
| JP | 8-106897 | | 4/1996 |
| JP | 9-63590 | | 3/1997 |
| JP | 9-73904 | | 3/1997 |
| JP | 09-087571 | * | 3/1997 |
| JP | 09-199135 | * | 7/1997 |
| JP | 10-21926 | | 1/1998 |
| JP | 11-025989 | * | 1/1999 |

* cited by examiner

*Primary Examiner*—Mark Kopec
*Assistant Examiner*—Kallambella Vijayakumar
(74) *Attorney, Agent, or Firm*—Armstrong, Kratz, Quintos, Hanson & Brooks, LLP

(57) ABSTRACT

A binder for battery comprising composite polymer particles in which two or more polymers having different chemical structures form a heterogeneous phase structure. Preferably, said two or more polymers include two polymers having a glass transition temperature (Tg) different from each other by 5° C. or more. When a slurry prepared by mixing the binder with a liquid material and an active material is used for the production of an electrode for a secondary battery, especially, a lithium secondary battery, the resulting battery exhibits an improved performance because the slurry imparts a well-balanced binding power and a binding durability.

14 Claims, 1 Drawing Sheet

BINDER FOR BATTERY, SLURRY FOR BATTERY ELECTRODE, ELECTRODE FOR LITHIUM SECONDARY BATTERY, AND LITHIUM SECONDARY BATTERY

This application is a Continuation of prior application Ser. No. 09/380,500 filed Sep. 3, 1999, now abandoned which is a 371 of PCT/JP98/000893, filed Mar. 4, 1998, and which is hereby incorporated by reference.

TECHNICAL FIELD

The present invention relates to a binder for a secondary battery and a use thereof, and more particularly, to a binder for a lithium secondary battery using composite polymer particles, a slurry for the battery obtained by using the binder, an electrode for a lithium secondary battery, and a lithium secondary battery.

BACKGROUND ART

Conventionally, a cell electrode is fabricated by dissolving a binder for battery (hereinafter, briefly referred to as "binder" when appropriate) in a solvent or dispersing it in a dispersion medium to form a binder composition, applying a slurry for battery electrode, which is a mixture of an active material and the binder composition, (hereinafter, briefly referred to as "slurry" when appropriate) to a collector, removing the solvent or the dispersion medium by a drying method and the like, thereby binding particles of the active material to the collector, and simultaneously to each other.

The battery capacity is determined by various factors, such as, the kind and quantity of the active material, the kind and quantity of the electrolyte and the like, but the performance of the binder is also an important factor. If a binder cannot bind a sufficient amount of active material particles to the collector and cannot allow active material particles to be bound to each other, a battery having large capacity cannot be obtained. Furthermore, the battery capacity is reduced since the active material is parted from the collector due to the repetition of charge and discharge.

For the binder, that is, strong binding powers between the collector and the active material and between active material particles (hereinafter, briefly referred to as "binding power" when appropriate), and a good binding durability by which parting of active material from the collector is prevented and by which separation of the active material particles from each other caused by the volume change of the active material particles due to the repetition of charge and discharge (hereinafter, referred to as "binding durability" when appropriate) are required.

As a binder for lithium secondary battery, a polyvinylidene fluoride polymer is widely used in the related industries. Such polyvinylidene fluoride polymer is dissolved in N-methylpyrrolidone and the like to prepare an organic solvent binder composition, and then, an active material is added to the organic solvent binder composition to form a slurry. Next, the slurry is applied to the collector, and dried to obtain an electrode. However, in the case of using this binder, there are some problems in the binding durability such that the active material particles are parted because of the volume change (due to lack of binding power) of the active material due to the repetition of charge and discharge, as well as insufficient binding power between the collector and the active material (for example, Japanese Unexamined Patent Publication No. H6-163031). It is assumed that these problems may happen because the polyvinylidene fluoride polymer surrounds the active material in the form of fibril, and thereby binding power among active material particles becomes strong, but binding power between the collector and the active material is not strong enough. In addition, since polyvinylidene fluoride polymer has poor rubber elasticity, it does not become effectively responsive to the volume change of the active material caused by the repetition of charge and discharge. Thus, sufficient binding durability for preventing the active material particles from being parted from each other cannot be obtained.

Therefore, considering the elasticity of a rubber, it is proposed to use a paste which is a mixture of an active material and an uncrosslinked rubber solution (for example, Japanese Unexamined Patent Publication Nos. H3-53450, H5-62668, and others), but the capacity may be reduced when this binder is used. Also, it is suggested to use rubber particles of a latex in an aqueous medium as a binder (for example, Japanese Unexamined Patent Publication Nos. H5-21068, 5-74461, and others), but the binding power between the collector and the active material of a conventional rubber latex is not so strong enough to reach the expected level.

In the case where such known rubber is used as a binder, a large elasticity-imparting effect can be obtained in terms of the binding durability, but a sufficient effect is not expected in terms of binding powers between an active material and a collector or among active material particles.

A method for intensifying binding power by use of mixing and dissolving carboxymethyl-cellulose in an aqueous styrene-butadiene rubber latex has been suggested (Japanese Unexamined Patent Publication No. H4-342966, etc.). However, since carboxymethyl-cellulose reduces electrode flexibility, the balance of binding power with binding durability of the rubber latex is affected, so that electrode having sufficient performance cannot be obtained. Thus, it is currently required to develop a novel binder for lithium secondary battery having excellent binding power and binding durability as well as excellent battery characteristics.

DISCLOSURE OF THE INVENTION

Taking the problems of the above-described conventional art into account, an object of the present invention is to provide a binder for battery having an excellent balance between binding power and binding durability, and excellent battery characteristics.

It is another object of the present invention to provide a slurry for cell electrode containing the binder for battery, a liquid material, and an active material.

According to the present invention, there is provided a binder for battery containing a composite polymer particle which has a heterogeneous phase structure made of two or more polymers having different chemical structures.

Further, according to the present invention, there is provided a binder composition for battery containing the binder and a liquid material; a slurry for cell electrode containing the binder, a liquid material, and an active material; a lithium secondary battery electrode made by using the slurry for battery; and a lithium secondary battery provided with the electrode.

BRIEF DESCRIPTION OF THE DRAWINGS

The drawings are enlarged sectional views showing several examples of the composite polymer particle having a heterogeneous-phase structure and constituting a binder for battery according to the present invention, wherein.

BEST MODE FOR CARRYING OUT THE INVENTION

Figure 1:
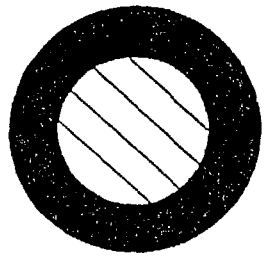
FIG. 1 is a cross-sectional view of a composite polymer particle having a core shell type heterogeneous phase structure.

1. Binder for Battery (Composite Polymer Particle)

Composite polymer particles comprised in a binder for battery of the present invention are particles in which two or more polymers having different chemical structures form a heterogeneous phase structure. Herein, "heterogeneous phase structure" means that body of particle structure is not comprised of a single homogeneous phase but of two or more phases different from each other. Each of polymers constituting the heterogeneous phase structure is not simply gathered closely as an agglomerated state, but is combined together by a chemical bonding. Preferably, two or more polymers comprised in a composite polymer particle include two kinds of polymers having a glass transition temperature (hereinafter, referred to as "Tg") different from each other by 5° C. or more.

The composite polymer particle used in the present invention is not a particle having homogeneous phase consisting of a single polymer (including so-called block polymer), but a single particle consisting of at least two polymers having chemical structures different from each other. That is, it is essentially needed that a single particle contains two or more polymers (typically, the polymers mainly contribute to the binding power and the binding durability) having chemical structures different from each other. In the case where the electrode is fabricated with a slurry for a cell electrode obtained by using the binder which is a mixture of a polymer particle of single chemical structure having predominant binding power and a polymer particle of single chemical structure having predominant binding durability, it is very difficult to homogeneously mix an active material with the binder because of differences in specific gravity, particle surface tension, surface polarity, particle size and others between the two polymers. But, if a plurality of polymers are used in the form of a single particle comprised of the polymers, these problems can be solved.

The proportion of at least two polymers contained in the composite polymer particle used in the present invention is such that the weight ratio A/B of one main polymer A to another main polymer B is usually in the range of 1/0.01 to 0.01/1, preferably 1/0.05 to 0.05/1. Also, the sum of the polymer A and the polymer B is generally 50% by weight or more, preferably 70% by weight or more, and more preferably 85% by weight or more, based on the total weight of the composite polymer particle.

The composite polymer particle used in the present invention does not have a completely mixed structure where two or more polymers including a polymer mainly contributing to binding power and a polymer mainly contributing to binding durability exist homogeneously in one particle, but has a heterogeneous phase structure where two or more polymers having chemical structures different from each other exist locally in one particle, so as to effectively exhibit both performances of binding power and binding durability.

Herein, heterogeneous phase structure means a structure formed not with a single homogeneous phase but with at least two different phases. Meanwhile, observing the cross-section of the particle, generally, since a plurality of phases are not uniformly distributed with the same form but take a peculiar distribution, the heterogeneous phase structure is also referred to as an irregularly distributed shape cross-sectional structure. Examples of the cross-section of polymer particle having heterogeneous phase structure are shown in FIGS. 1 to 9. That is, a core shell type heterogeneous phase structure (FIG. 1), an islands-in-sea type heterogeneous phase structure (FIG. 2), a partial core-shell type heterogeneous phase structure (FIG. 3, FIG. 4), a localized type heterogeneous phase structure (FIG. 5, FIG. 9), a raspberry type heterogeneous phase structure (FIG. 7), and a multi-particle composite type heterogeneous phase structure (FIG. 6, FIG. 8) are given (referring to "Setchaku", vol. 34, No. 1, p. 13–23, specifically, FIG. 6 on p. 17). Of these heterogeneous phase structures, a core-shell type heterogeneous phase structure (FIG. 1) is preferable. Also, of various heterogeneous phase structures described above, two or more may be combined to form one composite particle.

The composite polymer particle used in the present invention preferably contains two kinds of polymers, Tg of which are different from each other by 5° C. or more, among the polymers constituting the particle. As a result, performances of both binding power and binding durability may be more effectively manifested.

The composite polymer particle used in the present invention can be obtained by conventional polymerization methods, which include, for example, an emulsion polymerization method, a suspension polymerization method, a dispersion polymerization method, a seed polymerization method and others. As examples of method for fabricating the composite polymer particle having a heterogeneous phase structure used in the present invention, there can be mentioned a method (two-step polymerization method) of polymerizing a monomer corresponding to a polymer (a), using a conventional method, to a conversion of 20 to 100%, preferably 40 to 100%, and more preferably 80 to 100%, and subsequently adding a monomer corresponding to an another polymer (b) to polymerize them, and a method of obtaining a composite polymer particle by mixing with stirring at least two types of polymer particles in latex form, which have been prepared separately, at room temperature to 300° C., preferably 50 to 200° C., for 2 to 100 hours, preferably 4 to 50 hours.

As dispersing agent used in these polymerization methods, there can be mentioned conventional dispersion media used for preparing a latex, which include, for example, benzenesulfonates such as sodium dodecyl benzenesulfonate and sodium dodecyl phenyl-ether-sulfonate; alkylsulfates such as sodium laurylsulfate and sodium tetradodecylsulfate; sulfosuccinates such as sodium dioctylsulfosuccinate and sodium dihexylsulfosuccinate; fatty acid salts such as sodium laurate; ethoxy sulfate salts such as sodium polyoxyethylene lauryl ether sulfate and sodium polyoxyethylene nonyl-phenyl-ether sulfate; alkanesulfonate salts; sodium alkyl ether phosphates; non-ionic emulsifying agents such as polyoxyethylene nonyl-phenylether, polyoxyethylene sorbitan laurate and polyoxyethylene-polyoxypropylene block copolymer; and water soluble polymers such as gelatin, maleic anhydride-styrene copolymer, polyvinyl pyrrolidone, sodium polyacrylate and polyvinyl alcohol (degree of saponification of 75% or more and degree of polymerization of 700 or more). These dispersing agents maybe used either alone or as a combination of two or more thereof. The quantity of the dispersing agent added is optional, but is usually in the range of 0.01 to 10 parts by weight based on 100 parts by weight of monomers. Depending on the polymerization condition, the dispersing agent may not be used.

As a polymerization initiator, those which are used in the conventional emulsion polymerization, dispersion polymerization, suspension polymerization, seed polymerization and the like, can be used, which include, for example, persulfates such as potassium persulfate and ammonium persulfate; hydrogen peroxide; and organic peroxides such as benzoyl peroxide and cumene hydroperoxide. These initiators can be used either alone or as a redox type initiator which is a combination thereof with a reducing agent such as acid sodium sulfite, sodium thiosulfate or ascorbic acid. Furthermore, azo compounds such as 2,2'-azobisisobutylonitrile, 2,2'-azobis(2,4-dimethylvaleronitrile), 2,2'-azobis(4-methoxy-2,4-dimethyl-valeronitrile), dimethyl 2,2'-azobisisobutylate and 4,4'-azobis(4-cyanopentanoic acid); and amidine compounds such as 2,2'-azobis(2-aminodipropane) dihydrochloride, 2,2'-azobis(N,N'-dimethyleneisobutylamidine) and 2,2'-azobis(N,N'-dimethylene-isobutylamidine) dihydrochloride may be used. These polymerization initiators may be used either alone or as a combination of two or more thereof. The quantity of polymerization initiator used is in the range of 0.01 to 10 parts by weight, and preferably 0.1 to 5 parts by weight based on 100 parts by weight of the total monomers.

Polymerization temperature and time may optionally be set depending on the polymerization method or kinds of polymerization initiator used, but, the polymerization temperature is usually in the range of about 50 to 200° C. and polymerization time is usually in the range of about 0.5 to 20 hours. In polymerization, a conventional additive, such as, for example, polymerization coagent such as an amine, may also be used in combination.

Further, as another method for fabricating the composite polymer particle according to the present invention, there can be mentioned a method comprising the steps of mixing a plurality of polymers with or without solvent, followed by solidifying, drying, and grinding the dried polymer into powder, or followed by spray-drying the polymer into powder.

In the present invention, preferably, the composite polymer particle, which contains two polymers having Tg different from each other by 5° C. or more, may be fabricated by using the above-mentioned method. In such preferred composite polymer particle, if the particle is the composite polymer particle comprising a polymer A of a lower Tg and a polymer B of a higher Tg, the Tg difference between the polymer A and the polymer B is equal to 5° C. or more. If the particle is a composite polymer particle comprising a polymer A of a lower Tg, a polymer B of a higher Tg, and a polymer C of an arbitrary Tg, the Tg difference between the polymer A and the polymer B may be equal to 5° C. or more, and the Tg difference between the polymer A and the polymer C or the Tg difference between the polymer B and the polymer C may be alternatively less than 5° C. or not. The Tg of a polymer in the present invention is measured from dielectric loss varying depending upon temperature change.

The weight ratio of the polymer A of lower Tg and the polymer B of higher Tg is usually in the range of 1/0.01 to 0.01/1, preferably 1/0.05 to 0.05/1. Furthermore, the sum of the polymer A of lower Tg and the polymer B of higher Tg is preferably 50% by weight or more, more preferably 70% by weight or more, and especially preferably 85% by weight or more, based on the total weight of the composite polymer particle. If quantity of any one of the two polymers is too large, there may be problems such that balances of characteristics between the two polymers are lost, that cycle characteristics of battery are reduced, and that defects such as fractures and cutouts occur in the fabrication of electrode.

Though the Tg of polymer of lower Tg and the Tg of polymer of higher Tg are not particularly limited, the Tg of polymer of lower Tg is usually not lower than −200° C. and not higher than 30° C., preferably not lower than −160° C. and not higher than 20° C., and more preferably not lower than −100° C. and not higher than 10° C. If the Tg of polymer of lower Tg is too high, there may be defects as for binding power between a collector and an active material or among active materials, and flexibility of electrode. The Tg of polymer of higher Tg is higher than Tg of polymer of lower Tg by 5° C. or more, preferably by 10° C. or more, and more preferably by 30° C. or more. The upper limit of Tg difference is not particularly limited, but is usually not more than 500° C., preferably not more than 400° C., and more preferably not more than 300° C. Also, the upper limit of Tg of polymer with higher Tg is not particularly limited, but is usually not higher than 500° C., preferably not higher than 450° C., more preferably not higher than 350° C., and especially preferably not higher than 200° C. If the Tg difference between polymer of higher Tg and polymer of lower Tg is too small, sufficient effect of binding durability may not be obtained since separation of the active material due to the repetition of charge and discharge is increased. That is to say, polymer of higher Tg contributes to binding powers between a collector and an active material and among active material particles, and polymer of lower Tg contributes to binding durability of preventing the active material from separating from the collector due to volume change of the active material caused by repetition of charge and discharge. Thus, composite polymer particle containing both polymers of higher Tg and lower Tg is considered as a binder having a well-balanced binding power and binding durability.

The shape of the composite polymer particle used in the present invention is not particularly limited, and may be a spherical shape, an odd shape or an irregular shape. The diameter thereof is usually in the range of 0.005 to 1,000 μm, preferably 0.01 to 100 μm, and more preferably 0.05 to 10 μm. If the particle diameter is too large, when it is used as binder for battery, the internal resistance of electrode is increased since the particles are not readily bonded to the electrode active material. In contrast, if the particle diameter is too small, quantity of necessary binder is increased so that the surface of the active material is thoroughly coated therewith. The particle diameter is a value calculated as an average of the longest diameter and the shortest diameter of each of 100 particles as observed on a transmission electron microscope (TEM) photograph.

The gel content of the composite polymer particle used in the present invention is usually at least 30%, preferably at least 60%, and more preferably at least 80%. In the present invention, the gel content is computed out as toluene insoluble portion. More specifically, 1 g of composite polymer particle is dried at 100° C. for 24 hours, and the weight of the dried polymer is measured. Then, this composite polymer particle is dipped in 100 g of toluene at room temperature of 25° C. for 24 hours, and sieved with a sieve having a mesh size of 200. Next, the residual solid material on the sieve is dried to measure the weight thereof. Then, the gel content is calculated from the following equation:

Gel content (%)=(weight of residual dried solid on the sieve)/(total weight of dried composite polymer particle)×100

If the gel content is too small, the composite polymer particle is undesirably dissolved in electrolytic liquid.

The monomers used for the preparation of each polymer in the composite polymer particle used in the present invention include conjugated diene monomers, acrylic ester monomers, methacrylic ester monomers and monomers copolymerizable therewith.

As specific examples of the conjugate diene monomers, there can be mentioned 1,3-butadiene, isoprene, 2,3-dimethyl-1,3-butadiene, 1,3-pentadiene and piperylene. Of these, 1,3-butadiene, isoprene and 2,3-dimethyl-1,3-butadiene are preferable.

As specific examples of the acrylic ester monomers and the methacrylic acid ester monomers, there can be mentioned acrylic ester monomers such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxypropyl acrylate and lauryl acrylate; and methacrylic ester monomers such as methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxypropyl methacrylate and lauryl methacrylate. Crotonic ester monomers may also be used, which include, for example, methyl crotonate, ethyl crotonate, propyl crotonate, butyl crotonate, isobutyl crotonate, n-amyl crotonate, isoamyl crotonate, n-hexyl crotonate, 2-ethylhexyl crotonate and hydroxypropyl crotonate. Of these, alkyl methacrylates and alkyl acrylates, wherein the alkyl group has 1 to 6 carbon atoms, especially 1 to 4 carbon atoms, are preferable.

As the monomer copolymerizable with conjugate diene monomers, acrylic ester monomers and methacrylic ester monomers, there can be mentioned styrenic monomers such as styrene, α-methylstyrene, β-methylstyrene, p-t-butylstyrene and chlorostyrene; nitrile group-containing monomers such as acrylonitrile and methacrylonitrile; acrylamide type monomers such as acrylamide, N-methylolacrylamide and N-butoxymethylacrylamide; methacrylamide type monomers such as methacrylamide, N-methylolmethacrylamide and N-butoxymethylmethacrylamide; glycidyl group-containing monomers such as glycidyl acrylate, glycidyl methacrylate and aryl glycidyl ether; sulfonic acid group-containing monomers such as sodium styrenesulfonate and acrylamide methylpropanesulfonic acid; amino group-containing methacrylic monomers such as dimethylaminoethyl methacrylate and diethylaminoethyl methacrylate; alkoxy group-containing methacrylic monomers such as methoxy-polyethylene glycol monomethacrylate; unsaturated monocarboxylic acid monomers such as acrylic acid and methacrylic acid; unsaturated dicarboxylic acid monomers such as maleic acid, fumaric acid, citraconic acid, metaconic acid, glutaconic acid, itaconic acid, tetrahydrophthalic acid, crotonic acid, isocrotonic acid and nadic acid; and unsaturated dicarboxylic acid monoesters such as monooctyl maleate, monobutyl maleate and monooctyl itaconate. Of these, styrenic monomers, nitrile group-containing monomers, polycarboxylic acid monomers, unsaturated monocarboxylic acid monomers and alkoxy group-containing methacrylic monomers are preferable.

For the preparation of the composite polymer particle containing a plurality of polymers having a Tg difference of at least 5° C., monomers may optionally be combined to compose polymer of lower Tg, polymer of higher Tg, and the other polymers by using a known method. Polymers having Tg different from each other by 5° C. or more can be obtained by using monomers different from each other, or suitably choosing the composition ratio of monomers, the degree of polymerization or the degree of crosslinking.

Of polymers constituting the composite polymer particle used in the present invention, as preferable examples of the polymer having excellent binding durability and lower Tg, there can be mentioned homopolymers and copolymers of conjugate diene monomers, acrylic ester monomers, methacrylic ester monomers, and copolymers of conjugate diene monomers, acrylic ester monomers and methacrylic ester monomers with various monomers copolymerizable therewith. As specific examples of the homopolymers and copolymers, there can be mentioned polybutadiene, polyisoprene, styrene-1,3-butadiene copolymer, styrene-isoprene copolymer, styrene-1,3-butadiene-isoprene copolymer, 1,3-butadiene-acrylonitrile copolymer, 1,3-butadiene-isoprene-acrylonitrile copolymer, styrene-acrylonitrile-1,3-butadiene copolymer, styrene-acrylonitrile-1,3-butadiene-methyl methacrylate copolymer, styrene-acrylonitrile-1,3-butadiene-itaconic acid copolymer, styrene-acrylonitrile-1,3-butadiene-methyl methacrylate-fumaric acid copolymer, polystyrene-polybutadiene block copolymer, styrene-1,3-butadiene-itaconic acid-methyl methacrylate-acrylonitrile copolymer, styrene-n-butyl acrylate-itaconic acid-methyl methacrylate-acrylonitrile copolymer, and 2-ethylhexyl acrylate-methyl acrylate-acrylic acid-methoxypolyethylene glycol monomethacrylate copolymer.

As the polymer of higher Tg, homopolymers and copolymers of acrylic acid monomers, methacrylic acid monomers, acrylic ester monomers and methacrylic ester monomers, and copolymers of acrylic acid monomers, methacrylic acid monomers, acrylic ester monomers and methacrylic ester monomers with monomers copolymerizable therewith are preferably exemplified. As specific examples of the preferable homopolymers and copolymers for the polymer of higher Tg, there can be mentioned acrylic ester monomer- or methacrylic ester monomer-styrene copolymers and acrylic ester monomer- or methacrylic ester-styrene-1,3-butadiene copolymers. Furthermore, thermoplastic elastomers such as ethylene-propylene copolymer, ethylene-propylene-diene copolymer, styrene-butadiene-styrene block copolymer, styrene-ethylene-butylene-styrene block copolymer, styrene-isoprene block copolymer, styrene-ethylene-propylene-styrene block copolymer, methyl methacrylate polymer, vinyl alcohol polymer and vinyl acetate polymer are also preferably used as the polymer of higher Tg. As the acrylic ester monomers and methacrylic ester monomers, alkyl acrylates and alkyl methacrylates are preferable, and those which have an alkyl group having 1 to 4 carbon atoms are especially preferable.

In addition, to improve the binding power or the binding durability of the composite polymer particle, these polymers are preferably crosslinked by using a crosslinking agent. In the case of using a crosslinking agent, the quantity of the crosslinking agent employed varies depending upon the conditions of reaction and kinds of polymer, but is usually not more than 30% by weight based on the polymer.

As specific examples of the crosslinking agent, there can be mentioned peroxides such as benzoyl peroxide, dichlorobenzoyl peroxide, dicumylperoxide, di-tert-butylperoxide, 2,5-dimethyl-2,5-di(peroxide benzoate)hexyne-3, 1,4-bis (tert-butylperoxyisopropyl)benzene, lauroyl peroxide, tert-butyl peracetate, 2,5-dimethyl-2,5-di(tert-butylperoxy)-hexyne-3, 2,5-dimethyl-2,5-di(tert-butylperoxy)hexane, tert-butyl perbenzoate, tert-butyl perphenylacetate, tert-butyl perisobutylate, tert-butyl per-sec-octoate, tert-butyl perpivalate, cumyl perpivalate, and tert-butyl perdiethylacetate; azo compounds such as azobis isobutyronitrile, and dimethyl azoisobutylate; and crosslinking monomers, for example, dimethacrylate compounds such as ethylene diglycol dimethacrylate and diethylene glycol dimethacrylate; trimethacrylate compounds such as trimethylolpropane trimethacrylate; diacrylate compounds such as polyethylene glycol diacrylate and 1,3-butylene glycol diacrylate; triacrylate compounds such as trimethylolpropane triacrylate; and divinyl compounds such as divinylbenzene. Of these crosslinking agents, crosslinking monomers such as dimethacrylate compound such as ethylene glycol dimethacrylate, and divinyl compounds such as divinylbenzene are preferable. These crosslinking agents are used in an amount of usually 0.05 to 30 parts, preferably 0.5 to 10 parts, based on 100 parts of the monomers.

If necessary, a crosslinking aid such as sodium thiosulfate or an amine may be used in combination.

In the present invention, the above-described composite polymer particle may be used either alone or as a combination of two or more thereof, or as a combination thereof with a polymer particle other than the composite polymer particle. In the case where a combination of the composite polymer particle with polymer particle other than the composite polymer particle is used, if the proportion of the polymer particle other than the composite polymer particle is too large, the intended benefit cannot be obtained. Therefore, the ratio of the polymer particle other than the composite polymer particle should be limited to 50% by weight or smaller, preferably 30% by weight or smaller, based on the total weight of the polymer particles.

2. Binder Composition for Battery Electrode

The binder composition for battery electrode according to the present invention is obtained by dispersing the binder of the present invention in a liquid material.

The above-described composite polymer particle as a binder may be mixed together in a dry state with an additive or an active material, and then directly be press-bonded to a collector to obtain an electrode. Alternatively, a proper liquid material may be added to the composite polymer particle to prepare a paste, and then this paste is applied to the collector to obtain an electrode. Preferably, a binder composition is prepared by dispersing the above-described composite polymer particle in a liquid material as a proper dispersion medium, and to the binder composition, an active material and an additive, if necessary, are added to obtain a slurry, and then this slurry is applied to a collector to obtain an electrode.

The liquid material used as a dispersion medium in the binder composition of the present is not particularly limited. But, preferably, the liquid material is one which is liquid under an ordinary temperature and pressure and which is capable of preserving the shape of the composite polymer particle when a slurry for battery electrode according to the present invention, which is obtained by mixing the binder composition with an active material and others, (which slurry will be explained below), is applied to the collector and dried.

The liquid material (hereinafter, referred to as "dispersion medium" when appropriate), which can be used, may be a material which is capable of dispersing therein the composite polymer and an active material. As specific examples of the dispersion medium, there can be mentioned, water; alcohols such as methanol, ethanol, propanol, isopropanol, butanol, isobutanol, s-butanol, t-butanol, pentanol, isopentanol and hexanol; ketones such as acetons, methyl ethyl ketone, methyl propyl ketone, ethyl propyl ketone, cyclopentanone, cyclohexanone and cycloheptanone; ethers such as methyl ethyl ether, diethyl ether, dipropyl ether, diisopropyl ether, dibutyl ether, diisobutyl ether, di-n-amyl ether, diisoamyl ether, methyl propyl ether, methyl isopropyl ether, methyl butyl ether, ethyl propyl ether, ethyl isobutyl ether, ethyl n-amyl ether, ethyl isoamyl ether, and tetrahydrofuran; lactones such as γ-butyrolactone and δ-butyrolactone; lactams such as β-lactam; cycloaliphatic hydrocarbons such as cyclopentane, cyclohexane and cycloheptane; aromatic hydrocarbons such as benzene, toluene, o-xylene, m-xylene, p-xylene, ethylbenzene, propylbenzene, isopropylbenzene, butylbenzene, isobutylbenzene and n-amylbenzene; aliphatic hydrocarbons such as heptane, octane, nonane and decane; straight chain amides and cyclic amides, such as dimethylformamide and N-methylpyrrolidone; esters such as methyl lactate, ethyl lactate, propyl lactate, butyl lactate and methyl benzoate; and the liquid materials which can be a solvent for electrolyte, which will be explained below. Of these, it is advantageous to use dispersion media having a boiling point of 80° C. or higher, preferably 85° C. or higher in view of the fabrication process of electrode.

If necessary, an additive and the other preservation stabilizing agent, which will be explained with reference to the slurry, can be used.

3. Slurry for Battery Electrode

The slurry of the invention is a mixture of the above-mentioned binder composition of the invention with an active material and an optional additive.

An the active material, those which are usually used for lithium secondary battery, can be used. As examples of the active material for negative electrode, there can be mentioned carbonaceous materials such as amorphous carbon, graphite, natural graphite, PAN group carbon fiber derived from PAN such as MCMB, carbon fiber derived from pitch; electrically conductive polymers such as polyacene; lithium nitride metal compounds represented by the formula $Li_xM_yN_z$ (herein, Li is lithium atom; M is metal, preferably at least one selected from Mn, Fe, Co, Sn, B, Al, Ti, W, Si, Cu, V, Cr and Ni; N is nitrogen atom; and x, y and z are numerals of which the ranges are $7.0 \geq x \geq 1.0$, $4 \geq y \geq 0$, and $5 \geq z \geq 0.5$); composite metal oxides represented by the formula $A_xM_yO_p$ (herein, A is Li; M is a transition metal atom, preferably at least one selected from Co, Ni, Al, Sn and Mn; O is oxygen atom; and x, y and z are numeral of which the ranges are $1.10 \geqq x \geqq 0.05$, $4.00 \geqq y \geqq 0.85$ and $5.00 \geqq z \geqq 1.5$) and the other metal oxides; metal compounds such as $TiS_2$ and $LiTiS_2$.

As examples of the active material for positive electrode, there can be mentioned, $TiS_2$, $TiS_3$, amorphous $MoS_3$, $Cu_2V_2O_3$, amorphous $V_2O$—$P_2O_5$, $MoO_3$, $V_2O_5$, $V_6O_{13}$ and composite metal oxides represented by the formula $A_xM_y$-$N_zO_p$ (herein, A is Li, M is at least one selected from Co, Ni, Fe and Mn, N is metal other than M, preferably, at least one selected from Al and Sn, O is oxygen atom, and x, y, z and p are numeral of which the ranges are $1.10 \geqq x \geqq 0.05$, $4.00 \geqq y \geqq 0.85$, $2.00 \geqq z \geqq 0$ and $5.00 \geqq p \geqq 1.5$). Also, organic compounds including electrically conductive polymers such as polyacetylene and poly-p-phenylene can be used.

The amount of the active material in the slurry for electrode according to the present invention is not particularly limited, but is usually in the range of 1 to 1,000 times, preferably 2 to 500 times, more preferably 3 to 300 times, and most preferably 5 to 200 times as weight of that of the composite polymer particle.

If the amount of the active material is too small, the electrode may not sufficiently operate because the proportion of inactive portions in an active material-containing layer formed on a collector is increased. On the contrary, if the amount of the active material is too large, the active material may be parted from the collector because the adhesion of the active material to the collector is poor. The concentration of slurry can be reduced so as to be easily applicable onto a collector by adding a dispersion medium to the slurry for electrode. The added dispersion medium is similar to the liquid material mentioned above.

If necessary, various additives including a viscosity adjusting agent, a binding aid and an electrically conductive material can be incorporated in the slurry according to the present invention.

The additives can be chosen optionally. As specific examples of the additives, there can be mentioned cellulose compounds such as carboxymethylcellulose, carboxyethylcellulose, ethylcellulose, hydroxymethylcellulose, hydroxypropylcellulose and carboxyethylmethylcellulose, (these cellulose compounds include salts such as, for example, an ammonium salt and an alkali metal salt); water soluble polymers such as polyethylene oxide, polyethylene glycol and polycarboxylic acid; and uncrosslinked rubber having a polar group; PVDF; and PTFE. Depending on the situation, polymers such as rubbers or plastics having no polar group, such as ethylene-propylene rubber, polybutadiene, polyisoprene and polystyrene can be used. Of these, cellulose compounds and uncrosslinked rubbers having a polar group are preferably used in view of improvement of the performance of the battery.

4. Electrode for Lithium Secondary Battery

The electrode according to the present invention is fabricated by applying the above-mentioned slurry to a collector and removing the dispersion medium, thereby forming a matrix on the surface of the collector, wherein the active material is bound.

The collector is not particularly limited, provided that the collector is electrically conductive. But, the collector is usually made of metal such as, for example, iron, copper, aluminum or nickel. The shape of the collector is also not limited, but is usually in the form of a sheet having thickness of about 0.001 to 0.5 mm.

The method for applying the slurry to the collector is not particularly limited. For example, the slurry is applied by a doctor blade method, a dipping method, a brush coating method and others. Though the quantity of applied slurry is also not particularly limited, the thickness of the active material layer formed after removing the dispersion medium used may be in the range of about 0.005 to 5 mm, preferably about 0.05 to 2 mm. Also, the method for removing the dispersion medium is not particularly limited, but, it is preferable that the dispersion medium is volatilized as soon as possible within a speed such that the active material layer is not stripped from the collector nor the active material layer cracks due to the stress concentration.

5. Lithium Secondary Battery

A lithium secondary battery according to the present invention is provided with the electrode of the present invention as a positive electrode and/or a negative electrode. As examples of the lithium secondary battery, a lithium metal secondary battery, a lithium ion secondary battery, a lithium polymer secondary battery, and a lithium ion polymer secondary battery.

The electrolyte used for the lithium secondary battery may be conventional, and it is chosen according to the kinds of a negative electrode active material and a positive electrode active material so that the battery effectively operates. As specific examples of the electrolyte, there can be mentioned those which are usually used for a lithium secondary battery, such as $LiClO_4$, $LiBF_4$, $CF_3SO_3Li$, $LiI$, $LiAlCl$, $LiPF_6$, $LiAsF_6$, $LiCF_3SO_3$, $LiC_4F_9SO_3$ and $Li(CF_3SO_2)_2N$. As solvents used for the electrolyte, there can be mentioned, for example, ethers, ketones, lactones, nitriles, amines, amides, sulfur compounds, chlorinated hydrocarbons, esters, carbonates, nitro compounds, phosphate esters and sulfolane compounds. Generally, carbonates are preferably used, which include, for example, ethylene carbonate, propylene carbonate, dimethyl carbonate and diethyl carbonate.

The present invention will now be described more specifically by the following examples, and it should be understood that the present invention is not limited thereto. Parts in the examples are by weight.

In examples and comparative examples, gel content, Tg, and diameter and structure of a particle were measured by the methods or measuring apparatuses, set forth below.

(1) Gel content (%): 1 g of a composite polymer particle is dried at 100° C. for 24 hours, and the weight of the dried polymer particle is measured. Then, the dried polymer particle is dipped in 100 g of toluene at 25° C. for 24 hours, and sieved by using a sieve with a mesh size of 200 meshes. The residual solid on the sieve is dried, and the weight thereof is measured. The gel content is calculated from the following equation (I):

Gel content=(weight of residual dried solid on the sieve)/(weight of dried polymer particle)×100  (I)

(2) Tg: it is measured as the temperature at which a change of dielectric loss is observed with a temperature increasing rate of 1° C./min.

(3) Diameter and heterogeneous phase structure of polymer particle: the longest diameter and shortest diameter of each of 100 polymer particles are measured on transmission electron micrograph, and averaged. Further, depending on the particular polymer particles, the particles are dyed with osmic acid, and the heterogeneous phase structure inside the polymer particles is observed on the transmission electron micrograph (TEM).

EXAMPLE 1

(Preparation of Polymer)

To an autoclave with a pressure resistance of 50 kgf/cm² equipped with an agitator were added 400 parts of 1,3-butadiene, 200 parts of styrene, 5 parts of divinylbenzene as a crosslinking agent, 25 parts of sodium dodecylbenzenesulfonate, 1,500 parts of deionized water and 15 parts of azobisisobutyronitrile as a polymerization initiator and the content was thoroughly mixed and heated to 80° C. to be thereby polymerized. When the quantity of the monomer consumption reached 98%, 200 parts of methyl methacrylate, 50 parts of styrene, 5 parts of divinylbenzene and 200 parts of deionized water were added thereto, and the content was sufficiently mixed, and polymerized. Then, when the quantity of the monomer consumption reached 99.8%, the reaction mixture was cooled to stop the reaction. Thus, a latex of composite polymer particles "a" was obtained.

Figure 4:
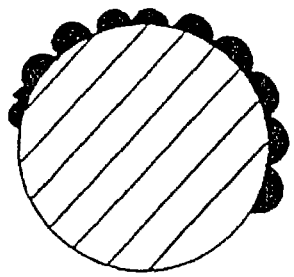
FIG. 4 is a cross-sectional view of a composite polymer particle having another partial core-shell type heterogeneous phase structure.
Figure 5:
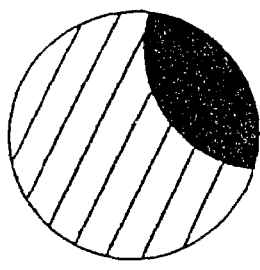
FIG. 5 is a cross-sectional view of a composite polymer particle having a localized type heterogeneous phase structure.

A cross section of each composite polymer particle "a" was treated with osmic acid to dye the portion having a carbon-carbon double bond whereby the inner structure of the polymer particle was observed. Observation by TEM revealed that the composite polymer particles "a" of the present invention were predominantly comprised of a core-shell type heterogeneous phase structure (FIG. 1), and contained minor amounts of an islands-in-sea type heterogeneous phase structure (FIG. 2), a partial core-shell type heterogeneous phase structure (FIG. 3, FIG. 4), and a localized type heterogeneous phase structure (FIG. 5).

The polymer particles "a" in a latex form had an average diameter of 0.28 μm as measured by TEM and Tgs of −79° C. and 105° C.

2,000 parts of 5% aqueous solution of aluminium sulfate were added to the obtained polymer latex to coagulate the composite polymer particles. The entire amount of the coagulated polymer latex was sieved with a nylon sieve with a 200 mesh size to remove water whereby a coagulated polymer was obtained. Then, the polymer was rinsed with diluted hydrochloric acid, followed by washing with water. The water washing was repeated until the aqueous layer became neutral. Water was removed from the washed polymer by filtration, and then the polymer was dried at 60° C. under vacuum for 12 hours to obtain dried composite polymer particles "a" (in an agglomerated form). The gel content in the composite polymer particles was 92%.

(Production of Negative Electrode)

The dried composite polymer particles "a" were dispersed in N-methylpyrrolidone (hereinafter, referred to as "NMP") by using a homogenizer to obtain a binder composition "A" comprising 15 parts of the composite polymer particles "a" (the weight of solid content) and 85 parts NMP.

The thus-obtained binder composition A was added to carbon (graphite carbon, "KS-15" supplied by LONZA L+T Ltd.) in an amount such that the weight of the composite polymer particle "a" in the binder composition was 10 parts (the weight of solidified portion) based on 90 parts of the carbon, and the mixture was thoroughly stirred to obtain a slurry for negative electrode. A copper foil having a width of 8 cm, a length of 20 cm, and a thickness of 18 μm was coated with the slurry. The coating of slurry was dried and roll-pressed to obtain a negative electrode A having a thickness of 25 μm.

(Production of Positive Electrode)

The above-mentioned binder composition A was added to lithium cobaltate in an amount such that the weight of the composite polymer particle "a" in the binder composition was 7 parts (the weight of solidified portion) based on 90 parts of the lithium cobaltate. 3 parts of acetylene black and 50 parts of NMP were further added to the mixture, and then the mixture was thoroughly stirred to obtain a slurry for positive electrode. An aluminum foil having a width of 8 cm, a length of 20 cm, and a thickness of 18 μm was coated with the slurry. The coating of slurry was dried and roll-pressed to obtain a positive electrode A having a thickness of 55 μm.

(Fabrication of Cell)

The obtained electrodes were cut into squares each having a size of 2 cm², and a polypropylene separator having a thickness of 25 μm was sandwiched by the squares of electrode. Then, 20 cells were fabricated by dipping these electrode squares into an electrolyte which is a solution containing $LiPF_6$ at a concentration of 1 mol/l in a mixed liquid composed of ethylene carbonate/diethyl carbonate at a 1:1 volume ratio.

(Evaluation of Cell Performance)

For evaluation of the cell capacity, each of the 20 cells was charged to 4.0 V by using a static current method at a current density of 0.1 MA/cm², and discharged to 3.0 V. The charge and discharge were repeatedly conducted and the discharge capacity was measured. The result was expressed by the average value of the measured discharge capacities.

The discharge capacity was 205 mAh/g as measured after the 5th cycle, 200 mAh/g as measured after the 10th cycle, and 195 mAh/g as measured after the 50th cycle (hereinafter, the discharge capacities as measured after the 5th cycle, after the 10th cycle and after the 50th cycle are abbreviated to discharge capacities after 5th cycle, 10th cycle and 50th cycle, respectively), so that the decrease of cell capacity due to the charge-discharge repetition was very minor.

EXAMPLE 2

(Preparation of Polymer)

To an autoclave with a pressure resistance of 50 kgf/cm² equipped with an agitator were added 340 parts of 1,3-butadiene, 200 parts of styrene, 20 parts of itaconic acid, 20 parts of methyl methacrylate, 20 parts of acrylonitrile, 5 parts of divinylbenzene as a crosslinking agent, 25 parts of sodium dodecylbenzenesulfonate, 1,500 parts of deionized water and 15 parts of azobisisobutyronitrile as a polymerization initiator, and the content was thoroughly mixed and heated to 80° C. to be thereby polymerized. When the quantity of the monomer consumption reached 98%, 200 parts of methyl methacrylate, 150 parts of styrene, 5 parts of divinylbenzene and 200 parts of deionized water were added thereto, and the content was thoroughly mixed, and polymerized. Then, when the quantity of the monomer consumption reached 99.8%, the reaction mixture was cooled to stop the reaction. Thus, latex of composite polymer particles "b" was obtained.

Figure 9:
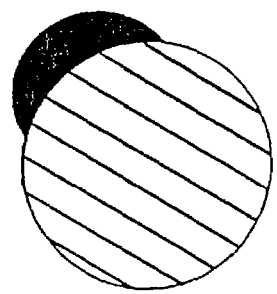
FIG. 9 is a cross-sectional view of a composite polymer particle having another localized type heterogeneous phase structure.

Observation by TEM in the same manner as in Example 1 revealed that the composite polymer particles "b" of the present invention were predominantly comprised of a core-shell type heterogeneous phase structure (FIG. 1), and contained minor amounts of an islands-in-sea type heterogeneous phase structure (FIG. 2), a localized type heterogeneous phase structure (FIG. 5), and a localized type heterogeneous phase structure (FIG. 9).

The composite polymer particle "b" had an average diameter of 0.17 μm, and Tgs of −51° C. and 102° C. The gel content thereof was 95%.

1,000 parts of NMP were added to 100 parts of the obtained latex, and water was removed from the mixture under reduced pressure at 80° C. by means of an evaporator to prepare a dispersion in NMP of the composite polymer particles "b" having a moisture content of 100 ppm. The gel content in the composite polymer particles "b" contained in the dispersion was 95%. The obtained polymer dispersion in NMP, as binder composition B, is used for fabrication of electrode.

(Production of Negative Electrode)

The thus-prepared binder composition B was added to carbon ("KS-15" supplied by LONZA L+T Ltd.) in an amount such that the weight of the composite polymer particle "b" in the binder composition was 5 parts(the weight of solidified portion) based on 92 parts of the carbon. Then, a solution of 1% by weight of hydroxyethyl cellulose in NMP was added thereto in an amount such that the solidified portion was 3 parts, and the mixture was thoroughly stirred mixed to obtain slurry for negative electrode. A copper foil having a width of 8 cm, a length of 20 cm, and a thickness of 18 µm was coated with the slurry. The coating of slurry was dried and roll-pressed to obtain a negative electrode B having a thickness of 25 µm.

(Production of Positive Electrode)

The above-mentioned binder composition B was added to lithium cobaltate in an amount such that the weight of the composite polymer particle "b" in the binder composition was 7 parts (the weight of solidified portion) based on 90 parts of the lithium cobaltate. 3 parts of acetylene black and 50 parts of NMP were further added thereto, and then the mixture was thoroughly stirred to obtain a slurry for positive electrode. An aluminum foil having a width of 8 cm, a length of 20 cm and a thickness of 18 µm was coated with the slurry. The coating of slurry was dried and roll-pressed to obtain a positive electrode B having a thickness of 55 µm.

(Fabrication of Cell)

In the same manner as in Example 1, a battery was fabricated by using the negative electrode B and the positive electrode B.

(Evaluation of Cell Performance)

In the same manner as in Example 1, the discharge capacity was measured. As the result of the measurement, the discharge capacity was 230 mAh/g after 5th cycle, 225 mAh/g after 10th cycle, and 222 mAh/g after 50th cycle, so that the decrease of cell capacity due to the charge-discharge repetition was very minor.

EXAMPLE 3

(Production of Negative Electrode)

The binder composition A prepared in Example 1 was added to carbon ("KS-15" supplied by LONZA L+T Ltd.) in an amount such that the weight of the composite polymer particle "a" in the binder composition was 5 parts(the weight of solidified portion) based on 92 parts of the carbon. Then, a solution of 1% by weight of carboxymethylcellulose in NMP was added thereto in an amount such that the solidified portion was 3 parts, and the mixture was thoroughly stirred mixed to obtain a slurry for negative electrode. A copper foil having a width of 8 cm, a length of 20 cm, and a thickness of 18 µm was coated with the slurry. The coating of slurry was dried and roll-pressed to obtain a negative electrode C having a thickness of 25 µm.

(Fabrication of Cell and Evaluation of Its Performance)

In the same manner as in Example 1, a battery was fabricated by using the negative electrode C and the same positive electrode A as used in Example 1, and the discharge capacity of the battery was measured. The discharge capacity was 235 mAh/g after 5th cycle, 228 mAh/g after 10th cycle, and 225 mAh/g after 50th cycle, so that the decrease of cell capacity due to the charge-discharge repetition was very minor.

EXAMPLE 4

(Preparation of Polymer)

To an autoclave with a pressure resistance of 50 kgf/cm$^2$ equipped with an agitator were added 340 parts of n-butyl acrylate, 100 parts of styrene, 20 parts of itaconic acid, 20 parts of methyl methacrylate, 20 parts of acrylonitrile, 5 parts of divinylbenzene as a crosslinking agent, 25 parts of sodium dodecylbenzenesulfonate, 1,500 parts of deionized water and 15 parts of azobisisobutyronitrile as a polymerization initiator, and the content was thoroughly mixed and heated to 80° C. to be thereby polymerized. When the quantity of the monomer consumption reached 98%, 200 parts of methyl methacrylate, 150 parts of styrene, 5 parts of divinylbenzene and 200 parts of deionized water were added thereto, and the content was thoroughly mixed, and polymerized. Then, when the quantity of the monomer consumption reached 99.8%, the reaction mixture was cooled to stop the reaction. Thus, a latex of composite polymer particles "d" was obtained.

Figure 2:
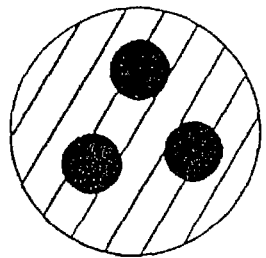
FIG. 2 is a cross-sectional view of a composite polymer particle having an islands-in-sea type heterogeneous phase structure.
Figure 3:
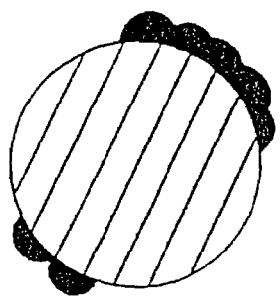
FIG. 3 is a cross-sectional view of a composite polymer particle having a partial core-shell type heterogeneous phase structure.

The composite polymer particles "d" had an average particle diameter of 0.19 µm and Tgs of 6° C. and 105° C. Observation by TEM in the same manner as in Example 1 revealed that the composite polymer particles "d" of the present invention were predominantly comprised of an islands-in-sea type heterogeneous phase structure (FIG. 2).

(Fabrication of Cell and Evaluation of Its Performance)

In the same manner as in Example 1, a binder composition D was prepared wherein the latex of composite polymer particles "d" was used instead of the latex of composite polymer particles "a" and propylene carbonate was used instead of NMP. A battery was fabricated using the binder composition D as in Example 1, and the discharge capacity of the battery was measured. The discharge capacity was 221 mAh/g after 5th cycle, 215 mAh/g after 10th cycle, and 210 mAh/g after 50th cycle, so that the decrease of cell capacity due to the charge-discharge repetition was very minor.

COMPARATIVE EXAMPLE 1

(Preparation of Polymer)

To an autoclave with a pressure resistance of 50 kgf/cm$^2$ equipped with an agitator were added 400 parts of 1,3-butadiene, 200 parts of styrene, 5 parts of divinylbenzene as a crosslinking agent, 25 parts of sodium dodecylbenzenesulfonate, 1,500 parts of deionized water and 15 parts of azobisisobutyronitrile as a polymerization initiator, and the content was thoroughly mixed and heated to 80° C. to be thereby polymerized. When the quantity of the monomer consumption reached 98%, 200 parts of methyl methacrylate, 50 parts of styrene, 5 parts of divinylbenzene and 200 parts of deionized water were added thereto, and the content was thoroughly mixed, and polymerized. Then, when the quantity of the monomer consumption reached 99.8%, the reaction mixture was cooled to stop the reaction. Thus, a latex of polymer particles having an average particle diameter of 0.17 µm was obtained.

The polymer particles were treated in the same manner as in Example 1 to prepare dried polymer particles. The dried polymer particles had a Tg of −82° C. and was proved not to be composite polymer particles. The gel content of the polymer particles was 92%.

(Fabrication of Cell and Evaluation of Its Performance)

In the same manner as in Example 1, a battery was fabricated using the thus-prepared polymer particles, and its performance was evaluated. The initial cell capacity was small. Discharge capacity of the battery was 150 mAh/g after 5th cycle, 140 mAh/g after 10th cycle, and 50 mAh/g after 50th cycle, so that the decrease of cell capacity due to the charge-discharge repetition was very large.

COMPARATIVE EXAMPLE 2

(Preparation of Polymer)

To an autoclave with a pressure resistance of 50 kgf/cm$^2$ equipped with an agitator were added 200 parts of methyl methacrylate, 50 parts of styrene, 5 parts of sodium dodecylbenzenesulfonate, 5 parts of divinylbenzene as a crosslinking agent, 1,000 parts of deionized water and 5 parts of azobisisobutyronitrile as a polymerization initiator, and the content was thoroughly mixed and heated to 80° C. to be thereby polymerized. When the quantity of the monomer consumption reached 99.8%, the reaction mixture was cooled to stop the reaction.

The polymer particles were treated in the same manner as in Example 1 to prepare dried polymer particles. The dried polymer particles had an average particle diameter of 0.21 μm and a Tg of 110° C. and was proved not to be composite polymer particles. The gel content of the polymer particles was 95%.

(Fabrication of Cell and Evaluation of Its Performance)

It was tried to fabricate a battery in the same manner as in Example 1, by using the thus-prepared polymer particles. But, cracks occurred in the electrodes for battery, and thus, the fabrication of a battery was impossible.

COMPARATIVE EXAMPLE 3

(Preparation of Polymer)

To an autoclave with a pressure resistance of 50 kgf/cm$^2$ equipped with an agitator were added 400 parts of 1,3-butadiene, 100 parts of styrene, 5 parts of divinylbenzene as a crosslinking agent, 25 parts of sodium dodecylbenzenesulfonate, 1,500 parts of deionized water and 15 parts of azobisisobutyronitrile as a polymerization initiator, and the content was thoroughly mixed and heated to 80° C. to be thereby polymerized. When the quantity of the monomer consumption reached 99%, the reaction mixture was cooled to stop the reaction. Thus, a latex of polymer particles Ha having an average particle diameter of 0.17 μm was obtained.

Separately, to an autoclave with a pressure resistance of 50 kgf/cm$^2$ and a rated capacity of 5 liter, equipped with an agitator, were added 200 parts of methyl methacrylate, 50 parts of styrene, 5 parts of divinylbenzene as a crosslinking agent, 25 parts of sodium dodecylbenzenesulfonate, 1,500 parts of deionized water and 15 parts of azobisisobutyronitrile as a polymerization initiator, and the content was thoroughly mixed and heated to 80° C. to be thereby polymerized. When the quantity of the monomer consumption reached 99.8%, the reaction mixture was cooled to stop the reaction. Thus, a latex of polymer particles Hb having an average particle diameter of 0.12 μm was obtained.

(Fabrication of Cell and Evaluation of Its Performance)

In the same manner as in Example 4, a battery was fabricated using a 1:1 by weight (solid content ratio) mixture of the thus-prepared polymer particles Ha and Hb, and its performance was evaluated. The initial cell capacity was very small. Discharge capacity of the battery was 113 mAh/g after 5th cycle, 90 mAh/g after 10th cycle, and 27 mAh/g after 50th cycle, so that the decrease of cell capacity due to the charge-discharge repetition was drastically large.

EXAMPLE 5

(Preparation of Polymer)

To a reactor equipped with an agitator, a reflux condenser, a thermometer, a dropping funnel and a nitrogen-introducing tube were added 500 parts of deionized water and 15 parts of sodium dodecyldiphenyletherdisulfonate, and the content was thoroughly stirred. Then the reactor was heated, and, while the inner temperature of the reactor was maintained at 80° C., a mixture of 86 parts of 2-ethylhexyl acrylate, 10 parts of methyl acrylate and 2 parts of acrylic acid, 5 parts of divinylbenzene, and a mixture of 25 parts of ammonium persulfate and 5 parts of deionized water were added to effect a reaction at 80° C. for 1 hour. Then, 774 parts of 2-ethylhexyl acrylate, 90 parts of methyl acrylate, 18 parts of acrylic acid, 20 parts of methoxypolyethylene glycol monomethacrylate, 5 parts of divinylbenzene, and a mixture of 300 parts of deionized water and 2 parts of sodium dodecyldiphenyletherdisulfonate, were added over a period of 4 hours through the dropping funnel, and the content was further reacted at 80° C. for 5 hours. Thereafter, the reaction mixture was cooled and aqueous ammonia was added to adjust the pH value to 8, whereby polymer particles "e-1" were prepared. Polymer particles e-1 had an average particle diameter of 0.26 μm and a Tg of –39° C. The gel content of polymer particles e-1 was 96%.

Separately, an autoclave equipped with an agitator was charged with 2,000 parts of water, 10 parts of sodium dodecylbenzenesulfonate, 15 parts of potassium persulfate, 500 parts of 1,3-butadiene, 480 parts of styrene, and 20 parts of methacrylic acid, and the content was reacted at 60° C. for 15 hours. After completion of the reaction, aqueous ammonia was added to adjust the pH value to 9, whereby polymer particles "e-2" were prepared. Polymer particles "e-2" had an average particle diameter of 0.22 μm and a Tg of 12° C.

A vessel equipped with an agitator was charged with a latex of polymer particles "e-1" and a latex of polymer particles "e-2". The proportion of the two latexes was 1:1 by weight as the solid content. While the inner temperature was maintained at 50° C., the content was stirred for 4 hours. Thereafter the content was cooled to room temperature to prepare a latex of composite polymer particles "e" with a composite particle structure. After the thus-prepared polymer particles in the latex were allowed to stand at room temperature for 1 hour, the particle diameter was measured and the composite state of the particles were observed in the same manner as in Example 1. The composite polymer particles "e" were predominantly comprised of an islands-in-sea type heterogeneous phase structure (FIG. 2), and contained a minor amount of a partial core-shell type heterogeneous phase structure (FIG. 4). The composite polymer particles "e" had an average diameter of 0.26 μm and Tgs of –39° C. and 12° C. The gel content of the composite polymer particles "e" was 95%.

(Fabrication of Cell and Evaluation of Its Performance)

In the same manner as in Example 2, a binder composition E was prepared wherein the latex of composite polymer particles "e" was used instead of the latex of composite polymer particles "b" and ethyl lactate was used instead of NMP. A battery was fabricated using the binder composition E as in Example 2, and the discharge capacity of the battery was measured. The discharge capacity was 205 mAh/g after 5th cycle, 201 mAh/g after 10th cycle, and 189 mAh/g after 50th cycle, so that the decrease of cell capacity due to the charge-discharge repetition was very minor.

EXAMPLE 6

(Preparation of Polymer)

To an autoclave with a pressure resistance of 50 kgf/cm² equipped with an agitator were added 200 parts of methyl methacrylate, 50 parts of styrene, 5 parts of divinylbenzene and 200 parts of deionized water, and the content was thoroughly mixed and heated to 80° C. to be thereby polymerized. When the quantity of the monomer consumption reached 98%, 400 parts of 1,3-butadiene, 100 parts of styrene, 5 parts of divinylbenzene as a crosslinking agent, 25 parts of sodium dodecylbenzenesulfonate, 1,500 parts of deionized water and 15 parts of azobisisobutyronitrile as a polymerization initiator were added thereto, and the content was thoroughly mixed, and polymerized. Then, when the quantity of the monomer consumption reached 99.8%, the reaction mixture was cooled to stop the reaction. Thus, a latex of composite polymer particles "f" was obtained.

Figure 6:
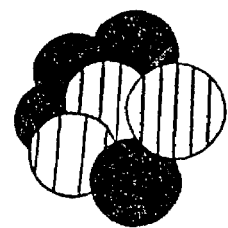
FIG. 6 is a cross-sectional view of a composite polymer particle having a multi-particle composite type heterogeneous phase structure.
Figure 7:
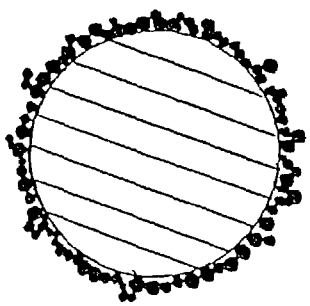
FIG. 7 is a cross-sectional view of a composite polymer particle having a raspberry type heterogeneous phase structure.
Figure 8:
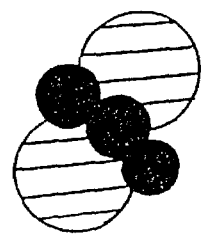
FIG. 8 is a cross-sectional view of a composite polymer particle having another multi-particle composite type heterogeneous phase structure.

Observation by TEM of the latex of composite polymer particles "f" revealed that the composite polymer particles "f" had an average particle diameter of 0.30 μm, and observation by TEM in the same manner as in Example 1 revealed that the composite polymer particles "f" were predominantly comprised of heterogeneous phase structure which is a combination of a core shell heterogeneous phase structure (FIG. 1) with an islands-in-sea type heterogeneous phase structure (FIG. 2), and contained a minor amount of a partial core-shell type heterogeneous phase structure (FIG. 4) and a multi-particle composite type heterogeneous phase structure (FIG. 6). The composite polymer particles "f" had Tgs of −55° C. and 100° C. The gel content thereof was 95%.

(Production of Negative Electrode)

A binder composition "F1" was prepared in the same manner as in Example 1 from 15 parts (solid content) of the thus-prepared composite polymer particles "f" and 85 parts of NMP. The binder composition F1 was added to carbon ("KS-15" supplied by LONZA L+T Ltd.) in an amount such that the weight of composite polymer particles "f" in the binder composition was 10 parts (the weight of solid content) based on 90 parts of the carbon, and the mixture was thoroughly stirred to prepare a slurry for negative electrode. A copper foil having a width of 8 cm, a length of 20 cm, and a thickness of 18 μm was coated with the slurry. The coating of slurry was dried and roll-pressed to obtain a negative electrode F having a thickness of 25 μm.

(Production of Positive Electrode)

The composite polymer particles "f" were dispersed in NMP in a manner similar to Example 2 to prepare a binder composition F2. The binder composition F2 was added to lithium cobaltate in an amount such that the weight of the composite polymer particle "f" in the binder composition was 7 parts (the weight of solid content) based on 90 parts of the lithium cobaltate. 3 parts of acetylene black and 50 parts of NMP were further added thereto, and then the mixture was thoroughly stirred to obtain a slurry for positive electrode. An aluminum foil having a width of 8 cm, a length of 20 cm and a thickness of 18 μm was coated with the slurry. The coating of slurry was dried and roll-pressed to obtain a positive electrode F having a thickness of 25 μM.

(Fabrication of Cell)

The obtained electrodes were cut into squares each having a size of 2 cm², and a polypropylene separator having a thickness of 25 μm was sandwiched by the squares of electrode. Then, 20 cells were fabricated by dipping these electrode squares into an electrolyte which is a solution containing $LiPF_6$ at a concentration of 1 mol/l in a mixed liquid composed of ethylene carbonate/diethyl carbonate at a 1:1 volume ratio.

(Evaluation of Cell Performance)

For evaluation of the cell capacity, each of the 20 cells was charged to 4.0 V by using a static current method at a current density of 0.1 mA/cm², and discharged to 3.0 V. The charge and discharge were repeatedly conducted and the discharge capacity was measured. The result was expressed by the average value of the measured discharge capacities.

The discharge capacity was 210 mAh/g after 5th cycle, 202 mAh/g after 10th cycle, and 185 mAh/g after 50th cycle, so that the decrease of cell capacity due to the charge-discharge repetition was very minor.

EXAMPLE 7

A negative electrode was produced in the same manner in Example 2 except that water was used as the dispersion medium for the binder instead of NMP. A positive electrode was produced in the same manner as in Example 1. A battery was fabricated from the negative electrode and the positive electrode, and its performance was evaluated. The discharge capacity was 199 mAh/g after 5th cycle, 194 mAh/g after 10th cycle, and 170 mAh/g after 50th cycle, so that the decrease of electric capacity was very minor.

EXAMPLE 8

(Preparation of Polymer)

To an autoclave with a pressure resistance of 50 kgf/cm² equipped with an agitator were added 150 parts of 1,3-butadiene, 30 parts of methyl methacrylate, 300 parts of styrene, 5 parts of divinylbenzene as a crosslinking agent, 25 parts of sodium dodecylbenzenesufonate and 1,500 parts of deionized water, and further 15 parts of azobisisobutyronitrile as a polymerization initiator. The content was thoroughly mixed and heated to 80° C. to be thereby polymerized. When the quantity of the monomer consumption reached 95%, 340 parts of n-butyl acrylate, 100 parts of styrene, 20 parts of itaconic acid, 20 parts of methyl methacrylate, 20 parts of acrylonitrile, 5 parts of divinylbenzene as a crosslinking agent, and 200 parts of deionized water were added thereto, and the content was thoroughly mixed, and polymerized. Then, when the quantity of the monomer consumption reached 99.8%, the reaction mixture was cooled to stop the reaction. Thus, a latex of composite polymer particles "g" was obtained. The composite polymer particles "g" had an average particle diameter of 0.25 μm, and partially a particle diameter of 0.20 μm, and Tgs of 5° C. and 112° C. The gel content thereof was 94%.

Observation of the composite polymer particles "g" by TEM in the same manner as in Example 1 revealed that the composite polymer particles "g" were predominantly comprised of a core shell heterogeneous phase structure (FIG. 1), and contained a minor amount of a partial core-shell type heterogeneous phase structure (FIG. 4) and a localized type heterogeneous phase structure (FIG. 5).

Fabrication of Battery and Evaluation of its Performance

A binder composition "G" was prepared in the same manner as in Example 1 by using a latex of the composite polymer particles "g" and γ-butyrolactone instead of NMP, and the discharge capacity was measured. The discharge capacity was 216 mAh/g after 5th cycle, 213 mAh/g after 10th cycle, and 213 mAh/g after 50th cycle, so that the decrease of electric capacity was very minor.

INDUSTRIAL APPLICABILITY

The binder for battery of the present invention comprises composite polymer particles having a heterogeneous structure made of two or more having different chemical structures form a heterogeneous phase structure. When a slurry prepared by mixing the binder with a liquid material and an active material is used for the production of the electrode for a secondary battery, the resulting battery exhibits an improved performance because the slurry imparts a well-balanced binding power and a binding durability. If two or more polymers of said composite polymer particles include two kinds of polymers having a glass transition temperature (Tg) different from each other by 5° C. or more, the above-mentioned advantages are prominently manifested, especially for a lithium secondary battery.

What is claimed is:

1. A slurry for a battery electrode comprising a binder composition for a battery, and an active material, wherein said binder composition for a battery comprises composite polymer particles, each of which has a heterogeneous phase structure made of two or more polymers having different chemical structures, and a liquid material;
   wherein said composite polymer particles are dispersed in the liquid material, and each of said two or more polymers is prepared from a monomer or monomers selected from the group consisting of conjugated diene monomers, acrylic ester monomers and methacrylic ester monomers, and monomers copolymerizable therewith.

2. An electrode for a lithium secondary battery produced by forming a film of the slurry for a battery electrode as claimed in claim 1 on a surface of a collector, and drying the film to remove the liquid material therefrom.

3. A lithium secondary battery comprising a positive electrode and a negative electrode, wherein at least one of said two electrodes is the electrode as claimed in claim 2.

4. The slurry for a battery electrode according to claim 1, wherein said two or more polymers include two kinds of polymers having a glass transition temperature (Tg) different from each other by 5° C. or more.

5. The slurry for a battery electrode according to claim 1, wherein said two or more polymers include two kinds of polymers having a glass transition temperature (Tg) different from each other by 10° C. or more.

6. The slurry for a battery electrode according to claim 1, wherein said two or more polymers include two kinds of polymers having a glass transition temperature (Tg) different from each other by 30° C. or more.

7. The slurry for a battery electrode according to claim 1, wherein the gel contents of said composite polymer particles are at least 30%.

8. The slurry for a battery electrode according to claim 1, wherein the liquid material has a boiling point of 80° C. or higher.

9. The slurry for a battery electrode according to claim 1, wherein each polymer particle has a particle diameter in the range of 0.005 μm to 1,000 μm.

10. The slurry for a battery electrode according to claim 1, wherein the heterogeneous phase structure comprises a core-shell type structure or an islands-in-sea type structure.

11. The slurry for a battery electrode according to claim 1, wherein the polymers constituting said composite polymer particles are crosslinked by using a crosslinking agent.

12. A slurry for a battery electrode comprising a binder composition for a battery, and an active material, wherein said binder composition for a battery comprises composite polymer particles, each of which has a heterogeneous phase structure made of two or more polymers having different chemical structures, and a liquid material;
   wherein said composite polymer particles are dispersed in the liquid material,
   wherein said two or more polymers include two kinds of polymers having a glass transition temperature (Tg) different from each other by 5° C. or more,
   wherein the two kinds of polymers having different glass transition temperatures include a first polymer and a second polymer, wherein the first polymer has a glass transition temperature (Tg) of at least 5° C. lower than that of the second polymer; and the first polymer is a homopolymer of a monomer selected from the group consisting of conjugated dienes, acrylic esters and methacrylic esters, or a copolymer of these monomers, or a copolymer of a monomer selected from these monomers with a copolymerizable monomer, and the second polymer is a homopolymer of a monomer selected from the group consisting of acrylic acid, methacrylic acid, acrylic esters and methacrylic esters, or a copolymer of these monomers, or a copolymer of a monomer selected from these monomers with a copolymerizable monomer.

13. An electrode for a lithium secondary battery produced by forming a film of the slurry for a battery electrode as claimed in claim 12 on a surface of a collector, and drying the film to remove the liquid material therefrom.

14. A lithium secondary battery comprising a positive electrode and a negative electrode, wherein at least one of said positive electrode and said negative electrode is an electrode as claimed in claim 13.

* * * * *